US011823716B2

(12) United States Patent
Baheti et al.

(10) Patent No.: US 11,823,716 B2
(45) Date of Patent: Nov. 21, 2023

(54) VIDEO TIMED ANCHORS

(71) Applicant: Google LLC, Mountain View, CA (US)

(72) Inventors: Prashant Baheti, Santa Clara, CA (US); Chériana Crystal Gretchen Griggs, San Bruno, CA (US); Kathryn Malia Tice, Mill Valley, CA (US); Pierce Anthony Vollucci, Mountain View, CA (US); Sam Becker, San Rafael, CA (US); Rick Maria Frederikus Van Mook, Utrecht (NL); Tsutomu Ohkura, Tokyo (JP); Yi Yang, San Jose, CA (US); Dimitra Papachristou, Mountain View, CA (US); Edward Santos, Lafayette, CA (US); Nicolas Crowell, Mountain View, CA (US); Steffanie McBrian, Mountain View, CA (US); Neesha Subramaniam, Palo Alto, CA (US); Gabe Culbertson, Madison, WI (US); Shoji Ogura, Tokyo (JP)

(73) Assignee: GOOGLE LLC, Mountain View, CA (US)

( * ) Notice: Subject to any disclaimer, the term of this patent is extended or adjusted under 35 U.S.C. 154(b) by 5 days.

(21) Appl. No.: 17/601,339

(22) PCT Filed: Apr. 4, 2019

(86) PCT No.: PCT/GR2019/000029
§ 371 (c)(1),
(2) Date: Oct. 4, 2021

(87) PCT Pub. No.: WO2020/201780
PCT Pub. Date: Oct. 8, 2020

(65) Prior Publication Data
US 2022/0165309 A1 May 26, 2022

(51) Int. Cl.
G11B 27/34 (2006.01)
G06F 40/20 (2020.01)
(Continued)

(52) U.S. Cl.
CPC .............. G11B 27/34 (2013.01); G06F 40/20 (2020.01); G06V 20/41 (2022.01); G06V 20/46 (2022.01); G06V 20/70 (2022.01); G11B 27/102 (2013.01)

(58) Field of Classification Search
CPC ....... G11B 27/34; G11B 27/102; G11B 27/32; G11B 27/031; G06F 40/20; G06V 20/41; G06V 20/46; G06V 20/70
See application file for complete search history.

(56) References Cited

U.S. PATENT DOCUMENTS

2012/0263430 A1 10/2012 Spitzer-Williams
2017/0109585 A1* 4/2017 Matias ................ H04N 21/251
2019/0141042 A1* 5/2019 Maresh ................... G06F 18/22

FOREIGN PATENT DOCUMENTS

JP 2000/299829 10/2000
JP 2006/157688 6/2006
(Continued)

OTHER PUBLICATIONS

International Search Report and Written Opinion for Application No. PCT/GR2019/000029, dated Oct. 8, 2020, 11 pages.
(Continued)

Primary Examiner — Girumsew Wendmagegn
(74) Attorney, Agent, or Firm — Dority & Manning, P.A.

(57) ABSTRACT

Methods, systems, and apparatus, including computer programs encoded on a computer storage medium, are provided, for generating video anchors for a video. In one aspect, a method includes obtaining key moment identifiers for a video, where each key moment identifier includes a
(Continued)

time index value specifying a playback time in the video, and is indicative subject matter of the video that has been determined to meet one or more interest criteria that define salient topics within the video. For each key moment identifier, a video anchor is generated, where each video anchor indicates a playback time for the video, and may include an image of a frame that occurs near the playback time. Upon a selection of the video anchor by the user, an instruction in the video anchor causes a video player to begin playback of the video at the playback time specified by the video anchor.

18 Claims, 5 Drawing Sheets

(51) Int. Cl.
*G06V 20/70* (2022.01)
*G06V 20/40* (2022.01)
*G11B 27/10* (2006.01)

(56) References Cited

FOREIGN PATENT DOCUMENTS

JP    2007/027990    2/2007
KR    2010-0113020   10/2010
WO    WO 2010/117213 10/2020

OTHER PUBLICATIONS

International Preliminary Report on Patentability for Application No. PCT/GR2019/000029, dated Oct. 5, 2021, 8 pages.

* cited by examiner

VIDEO TIMED ANCHORS

PRIORITY CLAIM

This application is based upon and claims the right of priority under 35 U.S.C. § 371 to International Application No. PCT/GR2019/000029 filed on Apr. 4, 2019. Applicant claims priority to and the benefit of each of such applications and incorporates all such applications herein by reference in their entirety.

BACKGROUND

This specification relates to video processing.

A video cannot be skimmed in the same way as web documents, and when a user is looking for something specific in a video, watching the video or manually scrubbing the video often does not result in the user finding the key moments in the video.

SUMMARY

This disclosure relates to computer implemented methods and systems that facilitate the creation and distribution of video anchors for a video.

In general, one innovative aspect of the subject matter described in this specification can be embodied in methods that include the actions of obtaining, for a video, a plurality of key moment identifiers, wherein each key moment identifier: includes a time index value specifying a playback time in the video, and is indicative subject matter of the video that has been determined to meet one or more interest criteria that define salient topics within the video; for each key moment identifier, selecting a proper subset of the video beginning at the playback time specified by the time index value, the proper subset of the video being less than a length of a video segment beginning at the playback time specified by the time index value and ending at a next most recent playback time specified by another time index value of another key moment identifier, determining, for the proper subset of the video, a textual label for the key moment identifier, processing each video frame of the proper subset of the video to determine whether to select a video frame from the proper subset of the video; generating, for each key moment identifier, a video anchor that includes: the textual label for the key moment identifier, in response to a determination to select a video frame of the proper subset of the video, an image generated from the video frame, an instruction that causes a video player on a user device to begin playback of the video at the playback time specified by the time index value of the key moment identifier; and providing, to a user device, data that causes the user device to render in a video player environment of the user device: each of the video anchors, for each video anchor, a time indicator in a progress bar of the video player, the time indicator corresponding to the playback time specified by the time index value and for each video anchor, a visual link from the corresponding time indicator to the video anchor; and wherein each video anchor is selectable by a user and upon a selection of the video anchor the instruction of the video anchor causes the video player on a user device to begin playback of the video at the playback time specified by the time index value. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The video timed anchors, which are referred to as "video anchors," change the way a playback environment operates. Specifically, the video anchors allow users to quickly ascertain key moments in the video, giving them a better sense of the video itself. The video timed anchors also allow users to directly skip to a point in the video, saving them time.

The processing system uses interest criteria that is indicative subject matter of the video that has been determined to meet defined salient topics within the video. Different interested criteria may be tailored to different video types. For example, sports videos may be processed according to particular interest criteria that allow the system to recognize depicted events for scores, blocks, and fouls; lecture videos may be processed according to linguistic criteria that allow the system to determine subject or topic changes; videos that include "lists" and then describe elements included in the lists may be processed according to list criteria that allow the system to recognize elements of a depicted list and then identify moments in the video during which the subject changes from one of the listed elements to another listed element. In other words, the system, by incorporating interest criteria of different types, enables the flexibility to process many different types of videos and generate video anchors for multiple salient topics within the videos.

The system can decide whether to include a video frame in the video anchor based on one or more video frame inclusion criteria. Because each video anchor has a limited amount of screen real estate, the decision of whether to include a video frame in a video anchor ensures that the data displayed for each video anchor differentiates from each other video anchor. In other words, video frames that are not informative of the salient topic to which the anchor corresponds are not included in the video anchor. For example, if a video is of a lecture, an image of the speaker for each video anchor is not informative. Thus by not using a video frame in the video anchor, a more descriptive textual label may be used, where each textual label describes the subject that the speaker is discussing.

Because the video anchors indicate salient topics of the video, users are more likely to select the video anchors to initiate playback at certain points in the video instead of streaming the entire video. This reduces network bandwidth streaming usage, which conserves network resources. Additionally, on the client side, the use video processing computation resources such as decoding and rendering are likewise reduced.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
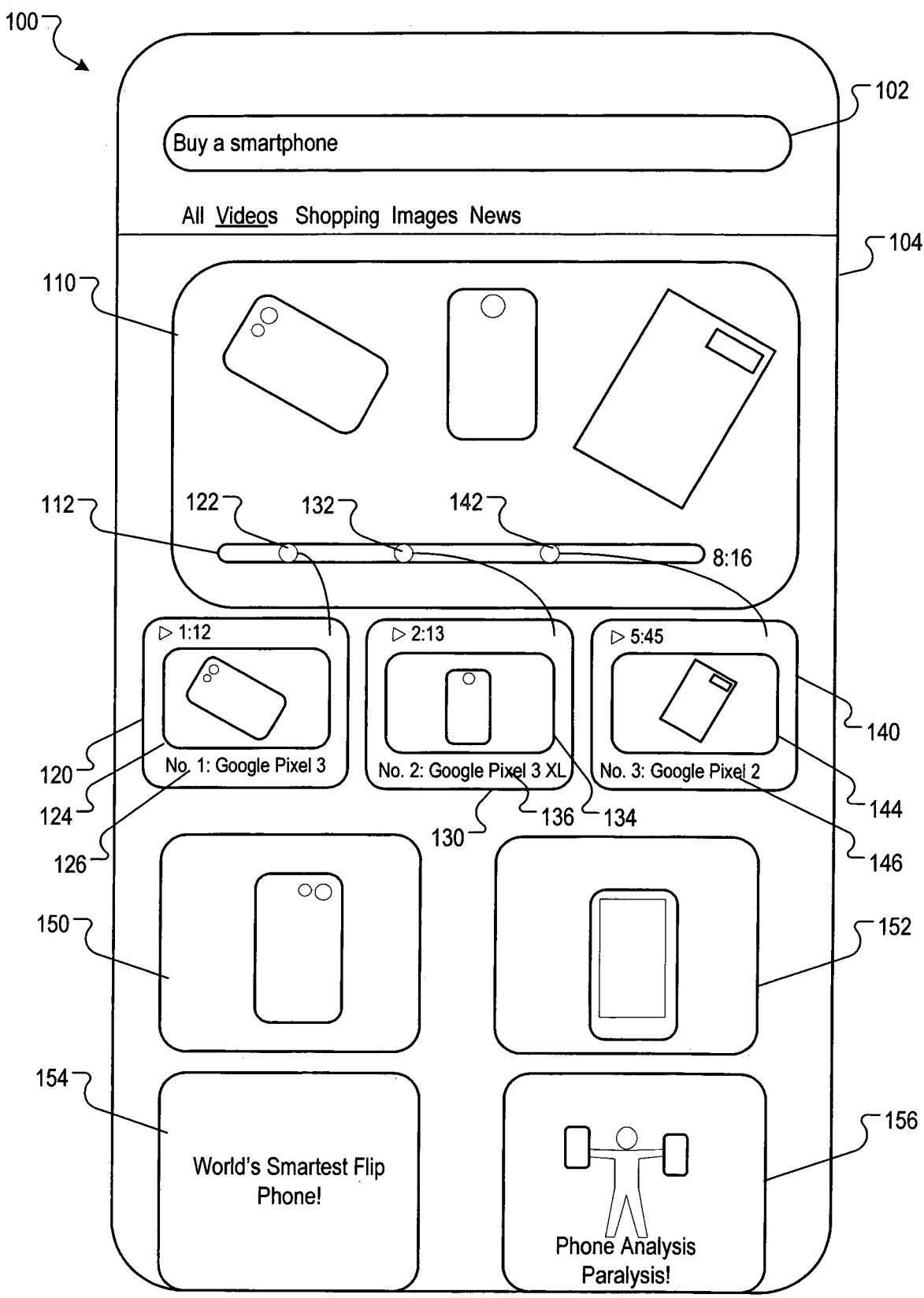
FIG. 1 is an illustration of a first video display environment in which video anchors are displayed.

The subject matter of this application exposes, by use of video timed anchors, different parts of a video. Each part of the video corresponding to a video anchor begins at a "key moment." The video anchors allow users to quickly ascertain important points in the video, giving them a better sense of the video itself, and also allow users to directly skip to a point in the video, saving them time.

A video timed anchor processing system processes videos to generate video anchors for each of the videos. In operation, a system obtains, for a video, a plurality of key moment identifiers. The key moment identifiers may be determined algorithmically, such as by a trained neural network, or may be provided by a human curator. Each key moment identifier includes a time index value specifying a playback time in the video, and is indicative subject matter of the video that has been determined to meet one or more interest criteria that define salient topics within the video.

For each key moment identifier, the system selects a proper subset of the video beginning at the playback time specified by the time index value. The proper subset of the video is a portion of the video that less than a length of a video segment beginning at the playback time specified by the time index value and ending at a next most recent playback time specified by another time index value of another key moment identifier. For example, if a first key moment identifier indicates a playback time of 1:00, and the next key moment identifier indicates a playback time of 2:30, the proper subset of the video begins at 1:00 and ends before 2:30.

The system determines, for the proper subset of the video, a textual label for the key moment identifier. The textual label can be determined by one or more of textual signals, visual signals, and manual curations. Textual signals include optical character recognition, caption data, and video meta data. Visual signals include embeddings, audio, and image label generation. Manual curations include manually generated annotations.

The system also process each video frame of the proper subset of the video to determine whether to select a video frame from the proper subset of the video, and then generates, for each key moment identifier, a video anchor. Each video anchor includes the textual label for the key moment identifier, and, if a video frame was selected, the video frame. Each video anchor also includes an instruction that causes a video player on a user device to begin playback of the video at the playback time specified by the time index value of the key moment identifier.

The data defining the video anchors are then stored in an index and associated with the video to which the data corresponds. The data causes a user device to render, in a video player environment of the user device, each of the video anchors. The data can then be served to user devices that request the video, along with the video itself. The system can provide, to a user device, the data in response to a video request. For each video anchor, the user device displays a corresponding time indicator in a progress bar of the video player, and a visual link from the corresponding time indicator to the visual anchor. Each displayed video anchor is selectable by a user and upon a selection of the video anchor the instruction of the video anchor causes the video player on a user device to begin playback of the video at the playback time specified by the time index value.

These features and additional features are described in more detail below.

FIG. 1 is an illustration of a first video display environment 100 in which video anchors 120, 130 and 140 are displayed. The example environment 100 may be implemented on a smart phone, a table, or a personal computer. Other computer-implemented devices, such as smart televisions, may also be used to implement the display environment 100.

In the example environment 100 of FIG. 1, a search query [Buy a smartphone] was provided to a search engine by use of a search input field 102. Result videos are displayed in a results environment 104. A top-ranked result video is displayed in a video player window 110. A first frame of the video is displayed, and a progress bar 112 indicates a time length of the video.

Beneath the video player window 110 are three video anchors 120, 130 and 140. Each video anchor 120, 130 and 140 has a corresponding time indicator 122, 132 and 142 in the progress bar 112 of the video player. Each time indicator corresponds to a playback time specified by a time index value for the video anchor. Additionally, each video anchor 120, 130 and 140 includes a visual link from the corresponding time indicator 122, 132 and 142 to the video anchor.

Each video anchor 120, 130 and 140 respectively includes a video frame 124, 134 and 144. Each video frame is selected from a portion of the video that occurs at or after a corresponding playback time in the video. How image frames are identified and selected is described in more detail below.

Each video anchor 120, 130 and 140 also respectively includes a textual label 126, 136 and 146 that each describe a salient topic in the video. In some implementations, each salient topic is identified when it is a new topic or a significant change in a topic of the video. How salient topics are identified is described in more detail below.

Embedded in each video-anchor 120, 130 and 140 is a respective instruction that causes the video player on the user device to begin playback of the video at the playback time specified by the time index value. The instruction is executed upon selection of a video anchor. For example, should a user select the video anchor 130, playback of the video in the video player window 110 would begin at the playback time of 2:13, as indicated in the video anchor 130 and in the progress bar 212.

Beneath the video anchors 120, 130 and 140 are additional video search results 150, 152, 154 and 156. In some implementations, selection of another video search result brings the focus on the video search result by placing the video referenced by the video search result in the video player window 110. Additionally, if the newly focused-on video has corresponding video anchors, the video anchors 120, 130 and 140 are replaced with video anchors corresponding to the newly focused-on video. In some implementations, the video anchors are served with each video search result and cached on the user device to reduce subsequent requests to the search system.

While only three video anchors are shown, in other implementations more video anchors may be shown. Additionally, more video anchors may be indicated by corresponding additional time indicators in the progress bar 112, and access to the video anchors may be realized by a gesture input, e.g., by swiping from right to left to "scroll" through the additional video anchors by introducing a next video anchor at the location of video anchor 140, and shift the video anchor 140 into the position of the video anchor 130, and likewise shifting the video anchor 130 into the position of video anchor 120. The first video anchor 120 is also removed from the display. Any other appropriate interaction model may also be used to access additional video anchors.

In some implementations, the system can decide whether to include an image of a video frame in a video anchor based on one or more video frame inclusion criteria. Because each video anchor has a limited amount of screen real estate, the decision of whether to include an image generated from a video frame in a video anchor ensures that the data displayed for each video anchor differentiates from each other video anchor. In other words, video frames that are not informative of the salient topic to which the video anchor corresponds can, in some implementations, be omitted from the video anchor. For example, if a video is of a lecture and only has video of a speaker, an image of the speaker for each video anchor is not informative. Thus, by not using a video frame in the video anchor, a more descriptive textual label may be used, where each textual label describes the subject that the speaker is discussing.

In some implementations, the image generated from a selected video frame is a thumbnail of the video frame. As used in this description, a "thumbnail" of the video frame is any image of the video frame that is dimensionally smaller than the actual video frame that the thumbnail depicts. In other implementations, the image may be a cropped portion of the video frame, e.g., a portion of the video frame that includes an object to be most relevant to the salient topic determined for the key moment identifier. Any appropriate object detection process can be used to detect and identify objects determined in a video frame.

Figure 2:
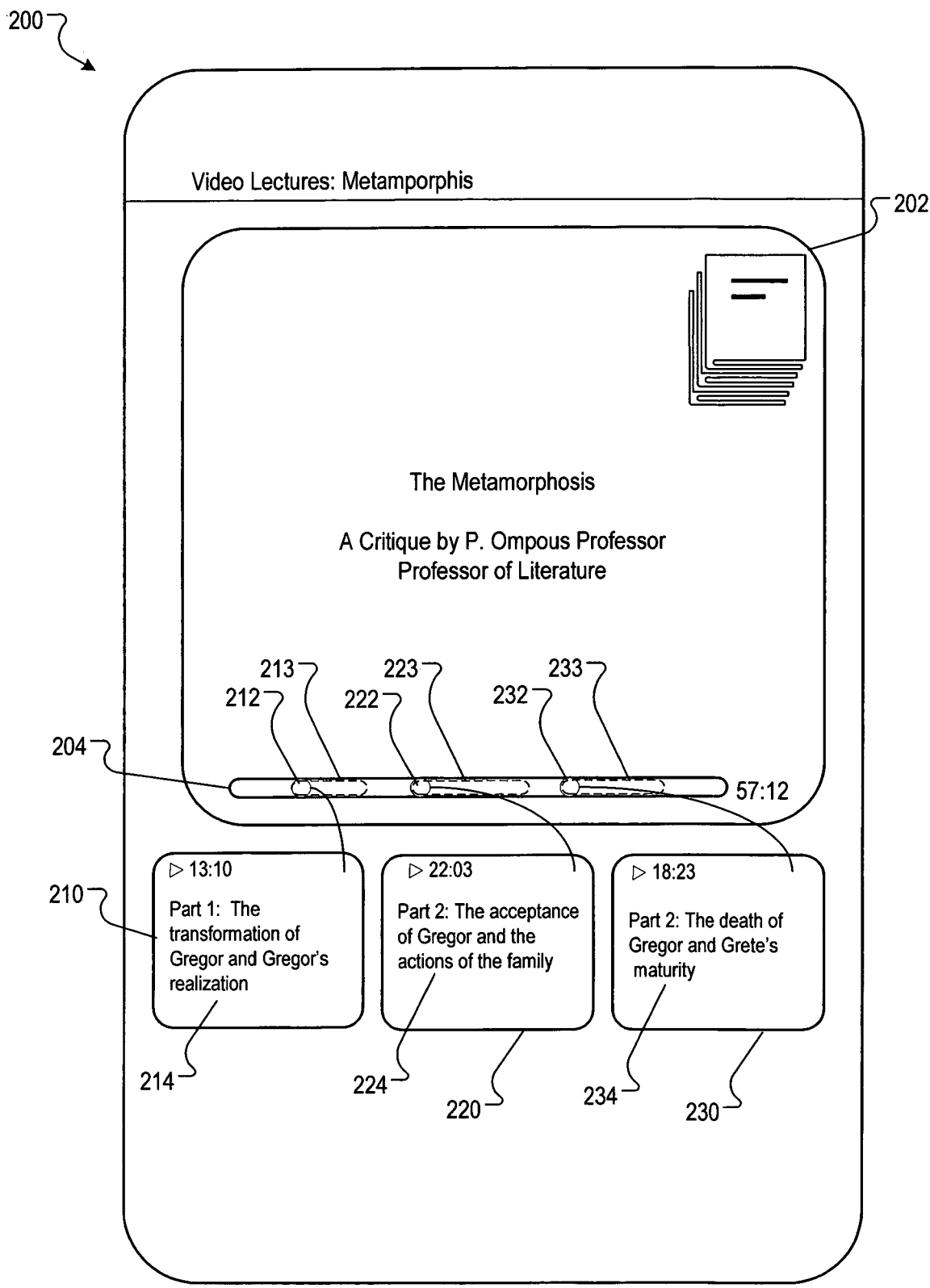
FIG. 2 is an illustration of another video display environment in which video anchors are displayed.

An example of "text only" video anchors is shown in FIG. 2, which is an illustration of another video display environment 200 in which video anchors are displayed. The display environment 200 may be, for example, a video player for video lectures. Beneath the video player window 202 are three video anchors 210, 220 and 230. Each video anchor 210, 220 and 230 has a corresponding time indicator 212, 222 and 232 in the progress bar 204 of the video player. Each time indicator corresponds to a playback time specified by a time index value for the video anchor. Additionally, each video anchor 210, 220 and 230 includes a visual link from the corresponding time indicator 212, 222 and 232 to the video anchor.

Each video anchor 210, 220 and 230 also respectively includes a textual label 214, 224 and 234 that each describe a salient topic in the video. In some implementations, when a video frame is not included, the textual label is more descriptive than when a video frame is included. For example, when a video frame is included, a textual label may be limited to six words; however, when a textual label is not included, the textual label may have a higher word limit, e.g., fifteen words. Of course, other word limits may also be used.

FIG. 2 also illustrates that video anchors may be used in environments other than an environment in which video search results are provided. In particular, video anchors may be provided in any video playback environment.

Figure 3:
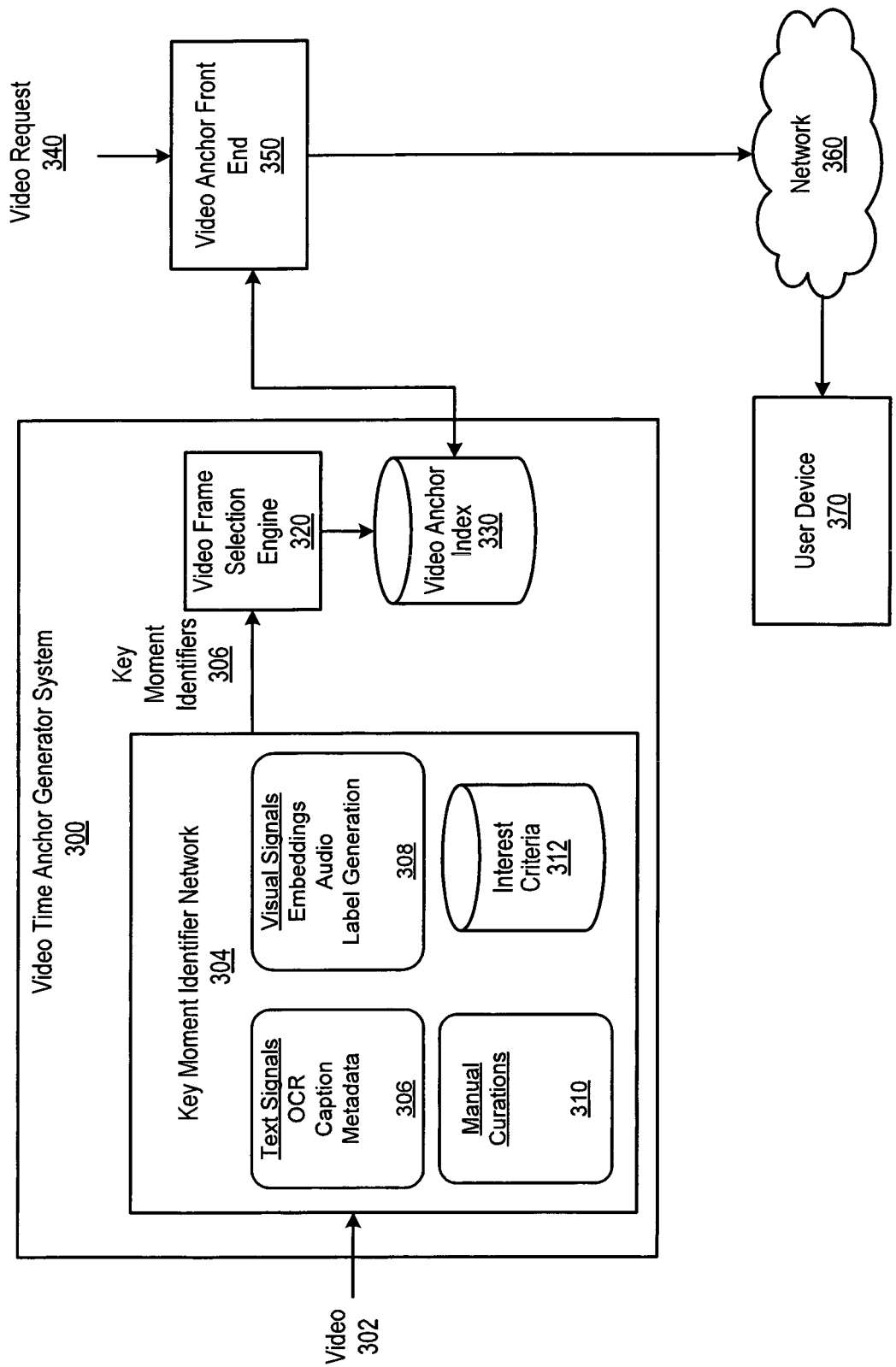
FIG. 3 is a block diagram of a system that generates video anchors for videos.
Figure 4:
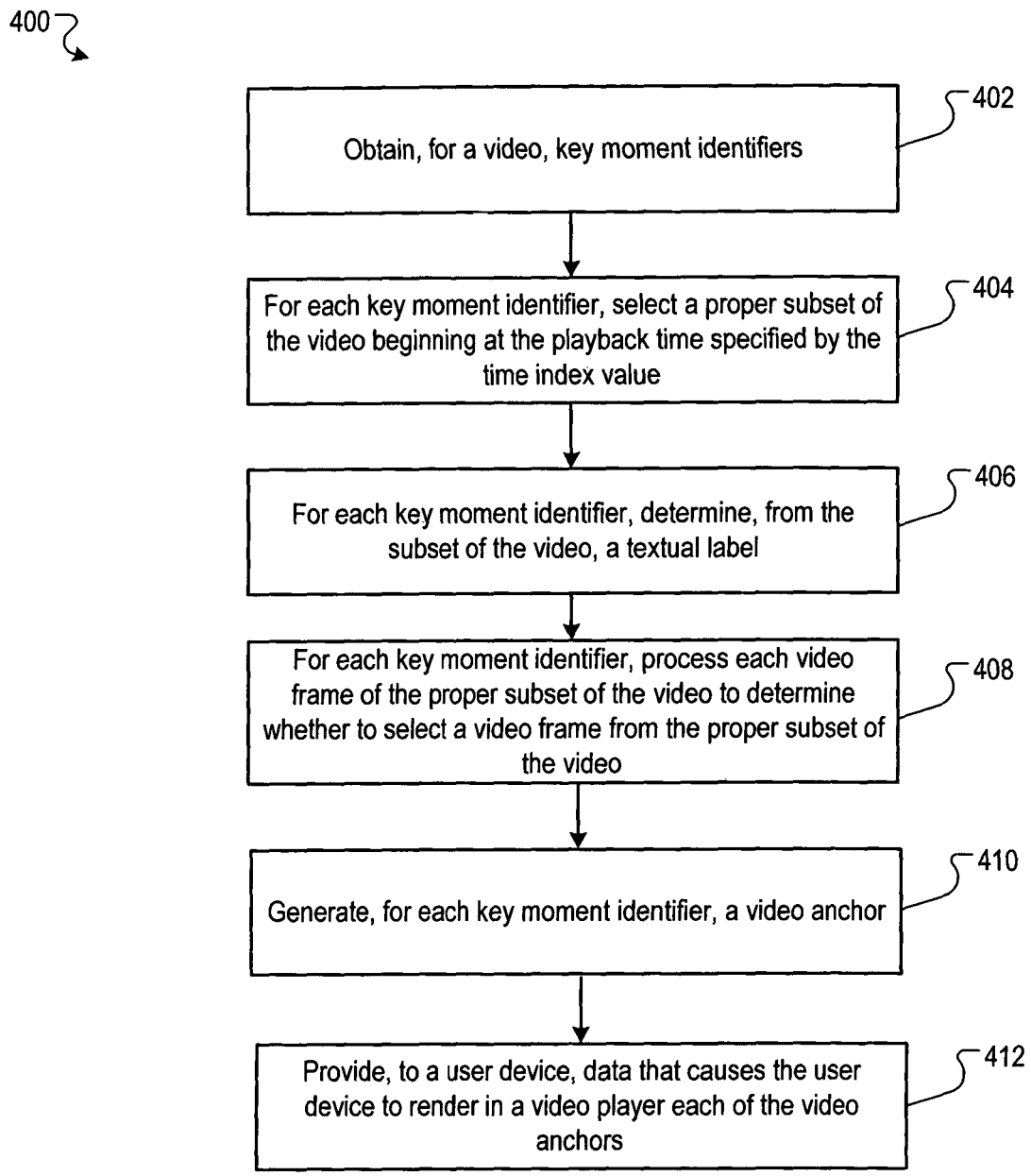
FIG. 4 is a flow diagram of an example process for generating video anchors.

FIG. 3 is a block diagram of a system 300 that generates video anchors for videos. The architecture of FIG. 3 is but one example architecture, and other architectures can also be used. Operation of the system 300 is described with reference to FIG. 4, which is a flow diagram of an example process 400 for generating video anchors.

The process 400 obtains, for a video 302, key moment identifiers 303 (402). Each key moment identifier 303 includes a time index value-specifying a playback time in the video, and is indicative subject matter of the video 320 that has been determined to meet interest criteria 312 that define salient topics within the video 302. The interest criteria 312 that define salient topics within the video may vary based on the video type. For example, interest criteria for a sports video may define salient topics to include the scoring of a goal, changes of possession, fouls, and any other event that may be determined to be of particular interest to users. By way of another example, interest criterial for a video that describes multiple different items in a serial manner may define a salient topic as the change focus from one subject item to another subject item, e.g., as shown in FIG. 1, a key moment occurs at the beginning segment of each review of a respective smart phone. Yet another example is for videos that are predominately speaking videos, e.g., lectures. In these videos, key moments may be when the lecturer changes from one topic to a next topic. Still yet another example is instructional videos. In these videos, the interest criteria may specify that the beginning of each step or instruction is a key moment.

The key moment identifiers may be determined algorithmically, such as by a trained neural network trained on interest criteria, or a deterministic process that references the interest criteria, or may be provided by a human curator with the video. For example, text signals 306, visual signals 308, and manual curations 310 may be used to obtain key moments. With respect to, text signals 306, optical character recognition may be used on video frames to determine the subject matter of the video over time, and closed caption data may also be used to determine the subject matter of the video over time, as well as metadata. A machine learned system may be trained to determine a dominant intent of the video over time, and when the dominant intent changes, the change may be identified as a key moment.

Visual signals 308 may also be used instead of, or in addition to, text signals. For example, visual embeddings by a neural network may be used to determine the subject matter of the video over time, as well as audio processing. With respect to audio process, the audio may be converted to text to identify the subject matter of the video over time. Again, a machine learned system may be trained to determine a dominant intent of the video over time, and when the dominant intent changes, the change may be identified as a key moment.

Some text and visual signals may on their own indicate key moments. Such signals are semantically indicative of a key movement, or visually indicative of a key moment. For example, the text or audio "The next step" is indicative of introducing as a subject a new instruction. Other such signals may include "Moving on . . . ," "The next chapter . . . ," and the like. Such text or audio may be specified by curators, or learned over a corpus of videos by machine learning techniques. With respect to video signals, scene changes, or changes from one product to another product, may indicate key moments. Likewise, the image of a ball going through a goal, or a player performing a certain act (e.g., hitting a ball, passing a goal line, etc.) may indicate a key moment. Such video frames may be specified by curators, or learned over a corpus of videos by machine learning techniques. Once a key moment is identified, a time index value specifying a playback time in the video at the key moment is determined.

The process 400, for each key moment identifier, selects a proper subset of the video beginning at the playback time specified by the time index value (404). The proper subset of the video is selected for label generation and video frame selection for generating an image for inclusion in a corresponding video anchor. Often key moments may be minutes apart, and processing the entirety of the video between indicators may result in slight topic drift from an identified salient topic. Accordingly, only a proper subset of the video is selected. The proper subset of the video begins at the playback time specified by the time index value, and is less than a length of a video segment beginning at the playback time specified by the time index value and ending at a next most recent playback time specified by another time index value of another key moment. In some implementations, the proper subset of video may be six seconds long. For example, with reference to FIG. 1, the proper subset of the video for the first key moment is from 1:12-1:18. Other lengths of time may also be used.

The process 400, for each key moment identifier, determines, for the proper subset of the video, a textual label for the key moment identifier (406). As described above, text signals, visual signals, and curated data may be used. In some implementations, the text label is generated in response to determining a most relevant topic for the proper subset of the video. For example, suppose the video is a recipe video, and the proper subset of the video includes the following audio: "Next, we are going to mix our dry ingredients in the mixing bowl with a whisk or a spoon. Mix the ingredients well enough so that . . . " A machine learned system, or a linguistic processing system, may take the text as input and generate the label "Mix the dry ingredients."

Labels may also be generated from visual analysis. For example, each frame of the video may be processed may an image processing system that determines a label that describe the content depicted in the frame. For example, from the recipe video, assume the frames are first of the chef, and then of the mixing bowl and utensils. Such labels may include "Chef, mixing bowl, whisk, flour."

The labels may be scored to determine a label or labels that best describe the key moment. Any appropriate relevance scoring process may be used. Additionally, natural language processing may be used to generate phrases from the labels that are more easily understood by users.

The process 400, for each key moment identifier, processes each video frame of the proper subset of the video to determine whether to select a video frame from the proper subset of the video (408). Because each video anchor has a limited amount of screen real estate, the decision of whether to include a video frame in a video anchor ensures that the data displayed for each video anchor differentiates from each other video anchor. In other words, video frames that are not informative of the salient topic to which the anchor corresponds are not included in the video anchor. For example, if a video is of a lecture, an image of the speaker for each video anchor is not informative. Thus by not using a video frame in the video anchor, a more descriptive textual label may be used, where each textual label describes the subject that the speaker is discussing.

In some implementations, while processing the video frames in the proper subset of video, a video frame selection engine 320 determines, for each video frame, a set of labels for the frame that describe content described in the video frame. The labels may be the same labels that were determined as described above. Thereafter, for each video frame, the system determines a similarity measure that measures the similarity of the set of labels for the video frame to the textual label for the key moment identifier, and then selects the video frame having a highest similarity measure for generating an image for inclusion in the video anchor. Any appropriate similarly measurement process may be used.

For example, returning to the recipe video, assume that the first three seconds of the proper subset of the video depict only the chef speaking, and the remaining three seconds depict the mixing bowl with the dry ingredients and the utensils. Also assume that the label for the segment are determined from text and visual signals, and the determined label is "Mix the dry ingredients." The video frames of the chef may have some labels regarding dry ingredients and mixing, but will also have labels that describe the person depicted. The labels for the frames depicting the mixing bowl, ingredients and utensils will have labels that describe the mixing bowl, dry ingredients, and the utensils. Thus, the frames with labels most similar to the determined label for the video anchor will be the latter frames depicting the mixing bowl, ingredients and utensils.

In some implementations, a frame with a highest similarity measure is only selected when it meets a selection threshold that specifies a minimum similarity measure for selection. The selection threshold may be selected such that there is a very high likelihood that a selected frame depicts objects or events that are described by the labels for the identified key moment.

To further reduce processing requirements, in some implementations, the video frames in the proper subset are compared to each other to determine a diversity measure. The diversity measure measures a difference between the video frame and one or more other video frames in the proper subset of the video. Selection of the video frames may be then based in part on the diversity measure.

Again returning to the recipe video, assume that the first three seconds of the proper subset of the video depict only the chef speaking, and the remaining three seconds depict the mixing bowl with the drying ingredients and the utensils. The diversity measures would group the first three seconds of video frames as being very similar, and the last three seconds of video frames as being very similar. Accordingly, to select a video frame, only one video frame need be processed from each group, and the video frame with the highest similarity measure to the label will be selected.

If all the frames are so similar that the diversity measure indicates they are grouped into a single group, such as in the case where the video is focused on the chef speaking for the entire proper subset of the video, then only one frame may be selected and its similarity measure determined. If the video frame does not meet the similarity threshold, it is not selected for generating an image for inclusion in the video anchor.

In other implementations, if all the frames are so similar that the diversity measure indicates they are grouped into a single group, then a video frame is not selected, and instead only a textual label is used in the video anchor.

The process 400 generates, for each key moment identifier, a video anchor (410). Each video anchor includes the textual label for the key moment identifier, an image generated from the video frame (if one was determined to be selected), and an instruction that causes a video player on a user device to begin playback of the video at the playback time specified by the time index value of the key moment identifier. The video anchors are then stored in a video anchor index 330, and associated with the videos to which they correspond.

At a later time, a user device 370 may issue a video request 340 to request a video. The request can be in response to a video search in a video search environment, or in response to accessing the video directly through some other video playback environment.

In response, the process 400 provides, to the user device, data that causes the user device to render in a video player environment each of the video anchors (412).

Figure 5:
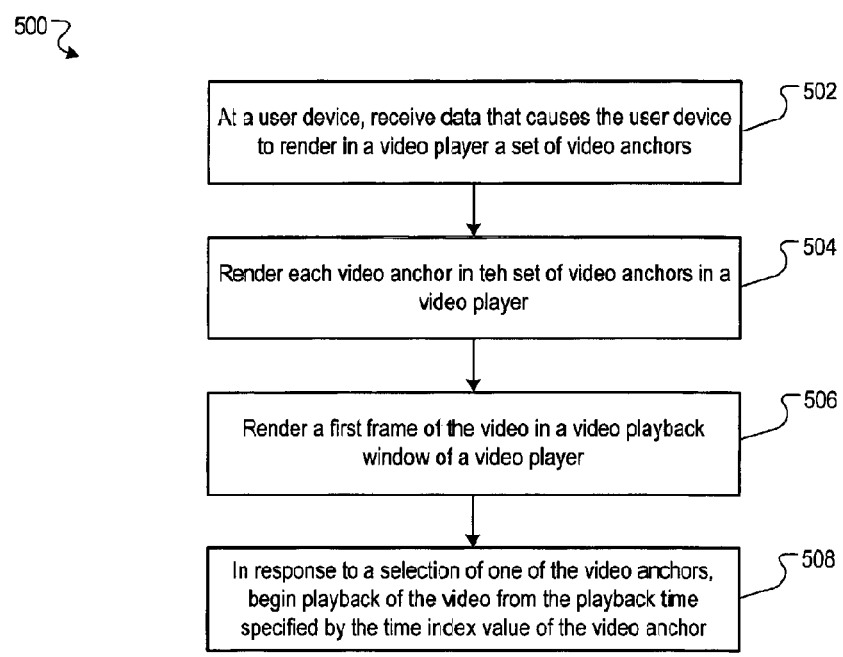
FIG. 5 is a flow diagram of an example process for processing video anchors at a user device.

User device side processing of the video anchors is described with reference to FIG. 5, which is a flow diagram of an example process 400 for processing video anchors at a user device.

The process 500 receives data that causes the user device to render in a video player a set of video anchors (502), and then 500 renders each video anchor in the set of video anchors (504). For example, the data includes, for each video anchor, data defining a time indicator in a progress bar of the video player, where the time indicator corresponds to the playback time specified by the time index value, and a visual link from the corresponding time indicator to the video anchor. The video anchor also includes a label describing the salient topic, and am image depicting the video frame, e.g., a thumbnail of the video frame or a cropped portion of the video frame, if a video frame was selected for the video anchor.

The process 500 renders a first frame of the video in a video playback window of a video player (506). For example, prior to playback of the video, the video player is in an initial state, and a first frame of a video is displayed in the video playback window.

The process 500, in response to a selection of one of the video anchors, causes the user device to begin playback of the video from the playback time specified by the time index value of the video anchor (508). For example, should a user select the video anchor 130 of FIG. 1, the instruction embedded in the video anchor would cause the user device to begin playback of the video in the video player window 110 at the playback time of 2:13.

In some implementations, each corresponding time indicator in the progress bar of the video player indicates a length of time of a portion of the video that begins at the playback time of the corresponding time indicator. The portion of the video so indicated may be a portion of the video determined to be relevant to the label. For example, as illustrated in FIG. 2, dashed indicators 213, 223, and 233 correspond to respective portions of the video determined to be most relevant to the label of the video anchor. The relevance can be determined by the processes described above.

In situations in which the systems discussed here collect personal information about users, or may make use of personal information, the users may be provided with an opportunity to control whether applications or features collect user information (e.g., information about a user's social network, social actions or activities, profession, a user's preferences, or a user's current location), or to control whether and/or how to receive content that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method, comprising:
obtaining, for a video, a plurality of key moment identifiers, wherein each key moment identifier:
includes a time index value specifying a playback time in the video; and
is indicative subject matter of the video that has been determined to meet one or more interest criteria that define salient topics within the video;
for each key moment identifier:
selecting a proper subset of the video beginning at the playback time specified by the time index value, the proper subset of the video being less than a length of a video segment beginning at the playback time specified by the time index value and ending at a next most recent playback time specified by another time index value of another key moment identifier;
determining, for the proper subset of the video, a textual label for the key moment identifier;

processing each video frame of the proper subset of the video to determine whether to select a video frame from the proper subset of the video;

generating, for each key moment identifier, a video anchor that includes:
  the textual label for the key moment identifier;
  in response to a determination to select a video frame of the proper subset of the video, an image depicting the video frame; and
  an instruction that causes a video player on a user device to begin playback of the video at the playback time specified by the time index value of the key moment identifier; and providing, to a user device, data that causes the user device to render in a video player environment of the user device:
  each of the video anchors; and
  for each video anchor, a time indicator in a progress bar of the video player, the time indicator corresponding to the playback time specified by the time index value;
  wherein each corresponding time indicator in the progress bar of the video player indicates a length of time of a portion of the video that begins at the playback time of the corresponding time indicator;
  wherein the length of time of the portion of the video that begins at the playback time is the portion of the video that is determined to meet a minimum relevance threshold indicating at least a minimum relevance to the label of the video anchor; and
  wherein each video anchor is selectable by a user and upon a selection of the video anchor the instruction of the video anchor causes the video player on a user device to begin playback of the video at the playback time specified by the time index value.

2. The computer-implemented method of claim 1, wherein the data further causes the user device to render for each video anchor a visual link from the corresponding time indicator to the video anchor.

3. The computer-implemented method of claim 1, wherein processing each video frame of the proper subset of the video to determine whether to select a video frame from the proper subset of the video comprises:
  determining, for each video frame, a set of labels for the frame that describe content described in the video frame;
  for each video frame, determining a similarity measure that measures the similarity of the set of labels for the video frame to the textual label for the key moment identifier; and
  selecting the video frame having a highest similarity measure for generating the image for inclusion in the video anchor.

4. The computer-implemented method of claim 3, wherein selecting the video frame having a highest similarity measure comprises selecting the video frame having the highest similarity measure and only when the highest similarity measure meets a selection threshold that specifies a minimum similarity measure for selection.

5. The computer-implemented method of claim 1, wherein processing each video frame of the proper subset of the video to determine whether to select a video frame from the proper subset of the video comprises:
  determining, for each video frame, a diversity measure that measures a different between the video frame and one or more other video frames in the proper subset of the video; and
  determining whether to select a video frame based in part of the diversity measures.

6. The computer-implemented method of claim 5, wherein determining whether to selected a video frame based in part of the diversity measures comprises:
  determining, based on the diversity measures, whether the video frames in the proper subset of the video meet a diversity threshold that specifies a minimum diversity.

7. The computer-implemented method of claim 6, further comprising:
  in response to determining the video frames in the proper subset of the video meet the diversity threshold, selecting to or more video frames from among the video frames of the proper subset of the video, and for each of the selected video frames:
    determining a set of labels for the video frame that describe content described in the video frame;
    determining a similarity measure that measures the similarity of the set of labels for the video frame to the textual label for the key moment identifier; and
  selecting the video frame having a highest similarity measure for generating the image for generating the image for inclusion in the video anchor.

8. The computer-implemented method of claim 6, further comprising:
  in response to determining the video frames in the proper subset of the video do not meet the diversity threshold, selecting one of the video frames in the proper subset of the video for generating the image for inclusion in the video anchor.

9. The computer-implemented method of claim 6, further comprising:
  in response to determining the video frames in the proper subset of the video do not meet the diversity threshold, not selecting any video frames in the proper subset of the video for generating the image for inclusion in the video anchor.

10. A system, comprising:
  a data processing apparatus; and
  a non-transitory computer readable medium in data communication with the data processing apparatus and storing instructions executable by the data processing apparatus and that upon such execution cause the data processing apparatus to perform operations comprising:
    obtaining, for a video, a plurality of key moment identifiers, wherein each key moment identifier:
      includes a time index value specifying a playback time in the video; and
      is indicative subject matter of the video that has been determined to meet one or more interest criteria that define salient topics within the video;
    for each key moment identifier:
      selecting a proper subset of the video beginning at the playback time specified by the time index value, the proper subset of the video being less than a length of a video segment beginning at the playback time specified by the time index value and ending at a next most recent playback time specified by another time index value of another key moment identifier;
      determining, for the proper subset of the video, a textual label for the key moment identifier;
      processing each video frame of the proper subset of the video to determine whether to select a video frame from the proper subset of the video, wherein processing each video frame of the proper subset of the video to determine whether to select a video frame from the proper subset of the video comprises:
  determining, for each video frame, a diversity measure that measures a different between the video frame and one or more other video frames in the proper subset of the video; and
  determining whether to select a video frame based in part of the diversity measures;
generating, for each key moment identifier, a video anchor that includes:
  the textual label for the key moment identifier;
  in response to a determination to select a video frame of the proper subset of the video, an image depicting the video frame; and
  an instruction that causes a video player on a user device to begin playback of the video at the playback time specified by the time index value of the key moment identifier; and
providing, to a user device, data that causes the user device to render in a video player environment of the user device:
  each of the video anchors;
  for each video anchor, a time indicator in a progress bar of the video player, the time indicator corresponding to the playback time specified by the time index value; and
wherein each video anchor is selectable by a user and upon a selection of the video anchor the instruction of the video anchor causes the video player on a user device to begin playback of the video at the playback time specified by the time index value.

11. The system of claim 10, wherein the data further causes the user device to render for each video anchor a visual link from the corresponding time indicator to the video anchor.

12. The system of claim 10, wherein processing each video frame of the proper subset of the video to determine whether to select a video frame from the proper subset of the video comprises:
  determining, for each video frame, a set of labels for the frame that describe content described in the video frame;
  for each video frame, determining a similarity measure that measures the similarity of the set of labels for the video frame to the textual label for the key moment identifier; and
  selecting the video frame having a highest similarity measure for generating the image for inclusion in the video anchor.

13. The system of claim 12, wherein selecting the video frame having a highest similarity measure comprises selecting the video frame having the highest similarity measure and only when the highest similarity measure meets a selection threshold that specifies a minimum similarity measure for selection.

14. The system of claim 10, wherein determining whether to select a video frame based in part of the diversity measures comprises:
  determining, based on the diversity measures, whether the video frames in the proper subset of the video meet a diversity threshold that specifies a minimum diversity.

15. The system of claim 14, further comprising:
  in response to determining the video frames in the proper subset of the video meet the diversity threshold, selecting to or more video frames from among the video frames of the proper subset of the video, and for each of the selected video frames:
    determining a set of labels for the video frame that describe content described in the video frame;
    determining a similarity measure that measures the similarity of the set of labels for the video frame to the textual label for the key moment identifier; and
  selecting the video frame having a highest similarity measure for generating the image for inclusion in the video anchor.

16. The system of claim 15, further comprising:
  in response to determining the video frames in the proper subset of the video do not meet the diversity threshold, selecting one of the video frames in the proper subset of the video for generating the image for generating the image for inclusion in the video anchor.

17. The system of claim 14, further comprising:
  in response to determining the video frames in the proper subset of the video do not meet the diversity threshold, not selecting any video frames in the proper subset of the video for generating the image for inclusion in the video anchor.

18. A non-transitory computer readable medium in data communication with the data processing apparatus and storing instructions executable by the data processing apparatus and that upon such execution cause the data processing apparatus to perform operations comprising:
  obtaining, for a video, a plurality of key moment identifiers, wherein each key moment identifier:
    includes a time index value specifying a playback time in the video; and
    is indicative subject matter of the video that has been determined to meet one or more interest criteria that define salient topics within the video;
  for each key moment identifier:
    selecting a proper subset of the video beginning at the playback time specified by the time index value, the proper subset of the video being less than a length of a video segment beginning at the playback time specified by the time index value and ending at a next most recent playback time specified by another time index value of another key moment identifier;
    determining, for the proper subset of the video, a textual label for the key moment identifier;
    processing each video frame of the proper subset of the video to determine whether to select a video frame from the proper subset of the video, wherein processing each video frame of the proper subset of the video to determine whether to select a video frame from the proper subset of the video comprises:
      determining, for each video frame, a set of labels for the frame that describe content described in the video frame;
      for each video frame, determining a similarity measure that measures the similarity of the set of labels for the video frame to the textual label for the key moment identifier; and
      selecting the video frame having a highest similarity measure for inclusion in the video anchor;
  generating, for each key moment identifier, a video anchor that includes:
    the textual label for the key moment identifier;
    in response to a determination to select a video frame of the proper subset of the video, an image generated from the video frame; and
    an instruction that causes a video player on a user device to begin playback of the video at the playback time specified by the time index value of the key moment identifier; and providing, to a user device, data that causes the user device to render in a video player environment of the user device:
  each of the video anchors;
  for each video anchor, a time indicator in a progress bar of the video player, the time indicator corresponding to the playback time specified by the time index value; and
  for each video anchor, a visual link from the corresponding time indicator to the video anchor; and
wherein each video anchor is selectable by a user and upon a selection of the video anchor the instruction of the video anchor causes the video player on a user device to begin playback of the video at the playback time specified by the time index value.

* * * * *

UNITED STATES PATENT AND TRADEMARK OFFICE
CERTIFICATE OF CORRECTION

PATENT NO. : 11,823,716 B2
APPLICATION NO. : 17/601339
DATED : November 21, 2023
INVENTOR(S) : Prashant Baheti et al.

It is certified that error appears in the above-identified patent and that said Letters Patent is hereby corrected as shown below:

On the Title Page

Item (72) should read:
Prashant Baheti: Santa Clara, CA, USA
Matthew Linkous: San Francisco, CA, USA
Wei Peng: Fremont, CA, USA
Chériana Crystal Gretchen Griggs: San Bruno, CA, USA
Kathryn Malia Tice: Mill Valley, CA, USA
Pierce Anthony Vollucci: Mountain View, CA, USA
Sam Backer: San Rafael, CA, USA
Rick Maria Frederikus Van Mook: Utrecht, Netherlands
Tsutomu Ohkura: Tokyo, Japan
Yi Yang: San Jose, CA, USA
Dimitra Papachristou: Mountain View, CA, USA
Edward Santos: Lafayette, CA, USA
Nicolas Crowell: Mountain View, CA
Steffanie McBrian: Mountain View, CA
Neesha Subramaniam: Palo Alto, CA, USA
Gabe Culbertson: Madison, WI, USA
Shoji Ogura: Tokyo, Japan Signed and Sealed this
Thirteenth Day of February, 2024

Katherine Kelly Vidal
*Director of the United States Patent and Trademark Office*